US012634911B2

(12) United States Patent　(10) Patent No.:　US 12,634,911 B2
Lee et al.　(45) Date of Patent:　May 19, 2026

(54) CONTROL RESOURCE SET FOR ENHANCED REDUCED CAPABILITY USER EQUIPMENT

(71) Applicant: Nokia Technologies Oy, Espoo (FI)

(72) Inventors: Gilsoo Lee, Naperville, IL (US); Nitin Mangalvedhe, Naperville, IL (US); Rapeepat Ratasuk, Naperville, IL (US); Man Hung Ng, Swindon (GB)

(73) Assignee: Nokia Technologies Oy, Espoo (FI)

( * ) Notice: Subject to any disclaimer, the term of this patent is extended or adjusted under 35 U.S.C. 154(b) by 337 days.

(21) Appl. No.: 18/480,084

(22) Filed: Oct. 3, 2023

(65) Prior Publication Data

US 2024/0114498 A1　Apr. 4, 2024

(30) Foreign Application Priority Data

Oct. 3, 2022　(GB) ...................................... 2214499

(51) Int. Cl.
*H04W 72/04*　(2023.01)
*H04W 72/0457*　(2023.01)
(Continued)

(52) U.S. Cl.
CPC ... *H04W 72/0457* (2023.01); *H04W 72/1273* (2013.01)

(58) Field of Classification Search
CPC ............. H04W 72/23; H04W 72/0453; H04W 72/0446; H04W 48/12; H04W 72/1273;
(Continued)

(56) References Cited

U.S. PATENT DOCUMENTS

2021/0136809 A1*　5/2021　Xu ..................... H04W 72/0446
2022/0256574 A1*　8/2022　Shi ...................... H04W 72/542
(Continued)

FOREIGN PATENT DOCUMENTS

WO　2021/126045 A1　6/2021
WO　2021/201756 A1　10/2021
(Continued)

OTHER PUBLICATIONS

"3rd Generation Partnership Project; Technical Specification Group Radio Access Network; NR; Physical layer procedures for control (Release 17)", 3GPP TS 38.213, V17.2.0, Jun. 2022, pp. 1-256.
(Continued)

*Primary Examiner* — Sai Aung
(74) *Attorney, Agent, or Firm* — Nokia Technologies Oy

(57)　ABSTRACT

Systems, methods, apparatuses, and computer program products for a second resource set for a reduced capability user equipment or enhanced reduced capability user equipment as well as a mapping offset for frequency diversity are provided. For example, a method may include receiving from a network element in a radio access network, a first configuration for a first control resource set (CORESET) having a bandwidth that exceeds a bandwidth of the terminal device. The method may also include determining a second configuration for a second CORESET. The second CORESET may have multiple segments. Each of the segments may not exceed a bandwidth of the terminal device.

16 Claims, 8 Drawing Sheets

(51) Int. Cl.
  *H04W 72/1273*    (2023.01)
  *H04W 72/23*     (2023.01)

(58) Field of Classification Search
  CPC ..... H04W 24/08; H04W 48/16; H04W 72/04;
                H04W 8/24; H04W 72/30
  See application file for complete search history.

(56)            References Cited

U.S. PATENT DOCUMENTS

| | | | | |
|---|---|---|---|---|
| 2023/0074205 | A1 | 3/2023 | Ratasuk et al. | |
| 2023/0199738 | A1* | 6/2023 | Mu ....................... | H04L 5/0053 |
| | | | | 370/329 |
| 2023/0379123 | A1* | 11/2023 | Mozaffari ............. | H04L 5/0053 |
| 2024/0179723 | A1* | 5/2024 | Wang ................ | H04W 72/0446 |
| 2024/0357664 | A1* | 10/2024 | Wang ....................... | H04W 8/24 |
| 2025/0193893 | A1* | 6/2025 | Zhang ................... | H04L 5/0005 |
| 2025/0274247 | A1* | 8/2025 | Mu ....................... | H04W 72/04 |

FOREIGN PATENT DOCUMENTS

| | | | |
|---|---|---|---|
| WO | 2021/211055 | A1 | 10/2021 |
| WO | 2022/029077 | A1 | 2/2022 |
| WO | 2022/031824 | A1 | 2/2022 |

OTHER PUBLICATIONS

"3rd Generation Partnership Project; Technical Specification Group Radio Access Network; NR; Physical layer procedures for data (Release 17)", 3GPP TS 38.214, V17.2.0, Jun. 2022, pp. 1-229.
Search Report received for corresponding United Kingdom Patent Application No. 2214499.2, dated Mar. 17, 2023, 3 pages.
"On solutions to further reduce UE complexity", 3GPP TSG RAN WG1 Meeting #109-e, R1-2204809, Agenda item: 9.6.1, Intel Corporation, May 9-20, 2022, pp. 1-10.
Extended European Search Report received for corresponding European Patent Application No. 23201164.3, dated Feb. 19, 2024, 13 pages.

* cited by examiner

UE gNB

Initialization
& Activation

Decides activation (e.g. for
short transmission)          410

Activation          420

Configuration

BW Size Supported by RedCap          430

Determine Ensured Offset
Based on RedCap BW          440

Transmission
& Receipt

460          PDCCH

465          PDSCH

Remapped Transmission (by
using ensured gap in a
mapping rule)          450

Apply a Modified Rule to
Decode (Including Trying
Different Offset Values)          470

CONTROL RESOURCE SET FOR ENHANCED REDUCED CAPABILITY USER EQUIPMENT

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to a second resource set for a reduced capability user equipment or enhanced reduced capability user equipment as well as a mapping offset for frequency diversity.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on 5G new radio (NR), but a 5G (or NG) network may also build on the E-UTRA radio. From release 18 (Rel-18) onward, 5G is referred to as 5G advanced. It is estimated that NR provides bitrates on the order of 10-20 Gbit/s or higher, and may support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which may provide both NR and LTE (and LTE-Advanced) radio accesses. It is noted that, in 5G, the nodes that may provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus may include at least one processor and at least memory storing instructions. The instructions, when executed by the at least one processor, may cause the apparatus at least to receive from a network element in a radio access network, a first configuration for a first control resource set (CORESET) having a bandwidth that exceeds a first bandwidth of the terminal device. The instructions, when executed by the at least one processor, may also cause the apparatus at least to determine a second configuration for a second CORESET. The second CORESET may include a plurality of segments. A second bandwidth of each segment of the plurality of segments may not exceed the first bandwidth of the terminal device.

An embodiment may be directed to an apparatus. The apparatus may include at least one processor and at least memory storing instructions. The instructions, when executed by the at least one processor, may cause the apparatus at least to send to a terminal device a first configuration for a first control resource set (CORESET) having a bandwidth that exceeds a first bandwidth of the terminal device. The instructions, when executed by the at least one processor, may also cause the apparatus at least to provide downlink control information to the terminal device in a second CORESET. The second CORESET may include a plurality of segments. A second bandwidth of each segment of the plurality of segments may not exceed the first bandwidth of the terminal device.

An embodiment may be directed to a method. The method may include receiving from a network element in a radio access network, a first configuration for a first control resource set (CORESET) having a bandwidth that exceeds a first bandwidth of the terminal device. The method may also include determining, a second configuration for a second CORESET. The second CORESET may include a plurality of segments. A second bandwidth of each segment of the plurality of segments may not exceed the first bandwidth of the terminal device.

An embodiment may be directed to a method. The method may include sending, to a terminal device, a first configuration for a first control resource set (CORESET) having a bandwidth that exceeds a first bandwidth of the terminal device. The method may also include providing downlink control information to the terminal device in a second CORESET. The second CORESET may include a plurality of segments. A second bandwidth of each segment of the plurality of segments may not exceed the first bandwidth of the terminal device.

An embodiment may be directed to an apparatus. The apparatus may include means for receiving from a network element in a radio access network, a first configuration for a first control resource set (CORESET) having a bandwidth that exceeds a first bandwidth of the terminal device. The apparatus may also include means for determining a second configuration for a second CORESET. The second CORESET may include a plurality of segments. A second bandwidth of each segment of the plurality of segments may not exceed the first bandwidth of the terminal device.

An embodiment may be directed to an apparatus. The apparatus may include means for sending to a terminal device a first configuration for a first control resource set (CORESET) having a bandwidth that exceeds a first bandwidth of the terminal device. The apparatus may also include means for providing downlink control information to the terminal device in a second CORESET. The second CORESET may include a plurality of segments. A second bandwidth of each segment of the plurality of segments may not exceed the first bandwidth of the terminal device.

BRIEF DESCRIPTION OF THE DRAWINGS

For proper understanding of example embodiments, reference should be made to the accompanying drawings, wherein.

DETAILED DESCRIPTION

Figure 1:
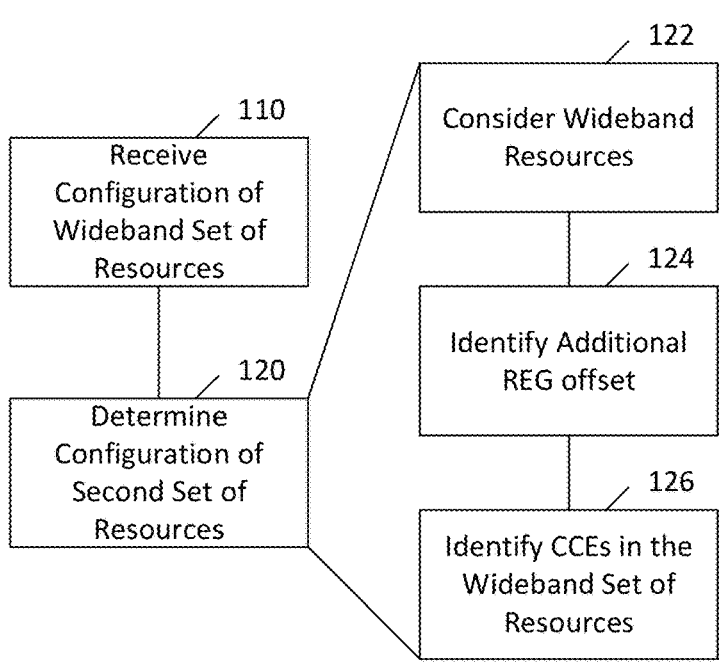
FIG. 1 illustrates a method according to certain embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing a second resource set for a reduced capability user equipment or enhanced reduced capability user equipment as well as a mapping offset for frequency diversity, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

The third generation partnership project (3GPP) in release 17 (Rel-17) may relate to reduced capability (RedCap) new radio (NR) or fifth generation (5G) new radio) devices. RedCap NR devices may include new device type and complexity reduction and power saving features to support mid-range internet of things (IoT) use cases. RedCap user equipment (UE) may achieve significant complexity reduction, compared to a reference NR UE. The total complexity reduction may be up to approximately 70% for frequency range 1 (FR1) with frequency division duplex (FDD) and time division duplex (TDD) and up to 50% for frequency range 2 (FR2) with TDD. In release 18 (Rel-18), the evolution of RedCap devices may be provided as part of 5G-Advanced. Rel-18 may aim for additional complexity reduction in FR1 bands. Rel-18 may provide lower-tier devices having a capability between massive IoT and Rel-17 RedCap devices.

In Rel-18, an enhanced RedCap (eRedCap) UE may be deployed with a 5 MHz operational bandwidth (BW). When Rel-18 5 MHz eRedCap UEs are deployed, a simple solution may be using the same 5 MHz control resource set (CORE-SET) for all UEs including Rel-18 5 MHz eRedCap UE, Rel-17 20 MHz RedCap UE, and non-RedCap UE. However, configuring CORESET in 5 MHz or less may significantly reduce CORESET coverage and performance for all UEs on the network. Therefore, ensuring coexistence between Rel-18 eRedCap and other Rel-17 RedCap/NR devices may present various challenges. For the coexistence and support of 5 MHz BW RedCap UE, there may be a remapping scheme applied to CORESET #0 into a 5 MHz BWP when the total system bandwidth is larger than 5 MHz.

After the initial access procedure, the reception of CORE-SETs other than CORESET #0 may be done by using the current specification, in which the network (NW) sets at least one of a UE's downlink (DL) bandwidth parts (BWPs) to a reduced BWP so that UE may receive a CORESET in the active reduced BWP.

Certain embodiments relate to the configuration of CORESETs for the reduced BW of a Rel-18 eRedCap UE. Assuming a number of RedCap UEs are deployed, more smaller BWPs may be used, so the number of configured BWPs may increase. In an example, the UE may be configured with at most 4 BWPs, but there may be no restriction on the number of BWPs of a cell.

In an implementation, an information element (IE), and a BWP-Id may refer to bandwidth parts. An initial bandwidth part may be referred to by BWP-Id 0. The other BWPs may be referred to by BWP-ID 1, BWP-ID 2, and so on up to a maximum number of bandwidth parts, maxNrofBWP, which may have the integer value of four. Thus, maxNrofBWP, may be the maximum number of bandwidth parts per serving cell for a user equipment. Because the number of BWPs per UE may be maxNrofBWPs=4, different UEs may be configured with different BWPs in a serving cell. However, configuring a number of different BWPs per cell may exponentially increase the complexity of the next generation node B (gNB) operation, such as scheduling. The gNB may need to store more information on the different UEs' BWP configurations.

To reduce the number of BWPs of a serving cell, eRedCap UE may be configured to operate in a wide BW. In this disclosure, certain embodiments may provide a way to configure a wide BW's CORESET within a reduced BWP of a RedCap UE.

Certain embodiments relate to a new configuration of a second CORESET in addition to the legacy CORESET. Since the legacy CORESET is unchanged, certain embodiments may not significantly affect a NR UE's operation. The second CORESET may enable a narrowband Rel-18 5 MHz eRedCap UE to be activated within a wide BWP, the same as an NR UE. Therefore, the gNB may not need to configure a separate BWP for an eRedCap UE, which may reduce the complexity of gNB implementation. Thus, certain embodiments may provide for the activation of eRedCap UE in a wide BWP, the configuration of a new second CORESET used to transmit PDCCH within the reduced BW of eRedCap UE, and the procedures enabling eRedCap UE device to receive and interpret a CORESET and receive the scheduled data within a reduced BWP of the eRedCap UE.

Certain embodiments are discussed with reference to a UE that is an eRedCap UE with 5 MHz bandwidth. This may be just an example. UEs with other bandwidths may be similarly considered with appropriate modifications.

FIG. 1 illustrates a method according to certain embodiments. As shown in FIG. 1, in step 110, a UE may receive a first configuration for a wideband CORESET, for example a first CORESET, that is larger than the UE's bandwidth. For example, the first configuration may be for a set of control resources, for example physical resource blocks (PRBs), having a 100 MHz bandwidth, whereas the UE itself may be configured to operate with at most a 5 MHz bandwidth. The bandwidth values of 100 MHz and 5 MHz are just examples. In the examples, the set or control resources may be configured to have a frequency domain size and a time domain size. Then the bandwidth of the set of control resources may be the configured frequency domain size or resource allocation.

In step 120, the UE may determine a second configuration for at least one occasion, for example segment, of a second CORESET associated with the wideband CORESET, which may be referred to as the first CORESET. In the second configuration, a bandwidth of each of the at least one occasion of the second CORESET, considered alone, may not exceed the UE bandwidth. The time and frequency configuration, for example the second configuration, for each occasion or segment of the second CORESET may be explicitly signaled by the network to the UE or may be implicitly determined by the UE based on predefined rules. For example, the time and frequency configuration of a first occasion or segment of the second CORESET may be a portion or subset of the wideband CORESET. The bandwidth of each occasion of the second CORESET may be the frequency domain size of the occasion. Furthermore, the time and frequency configuration may provide a time domain size and a frequency domain size, respectively.

The wideband CORESET, which may be the first CORESET, may convey downlink control information (DCI), for example in a physical downlink control channel (PDCCH). The resources of the wideband CORESET and the resources of the second CORESET may be a set of physical resources, such as PRBs, which may be viewed as control channel elements (CCEs). More specifically, each CCE may include resource element group (REG) bundles where each REG bundle includes multiple REGs. A resource element group may be a block of consecutive resources elements (REs) within a same orthogonal frequency division multiplexed (OFDM) symbol. Within a long term evolution (LTE) subframe, the PDCCH control region of the subframe may be a first set of CCEs within the subframe. Similarly, in 5G NR, the PDCCH CORESET may be divided into different REGs at the beginning of a NR slot, which may or may not be frequency contiguous. For ease of explanation, a contiguous case may be considered for simplicity. A PDCCH may be carried by one or many CCEs. A CCE-to-REG mapping may be interleaved or non-interleaved. The interleaved option may allow for greater frequency diversity. The DCI conveyed in the first CORESET may be substantially the same as DCI conveyed in the second CORESET. For example, the DCI conveyed in the first CORESET and the second CORESET may be exactly the same as one another, almost exactly the same as one another, mostly the same as one another, or at least 50% the same as one another. Thus, the DCI conveyed in the first CORESET may be substantially the same as the DCI conveyed in the second CORESET if any deviations or modifications do not significantly alter the function or effects from the example embodiments disclosed herein.

In step 122, while determining the configuration of the supplemental set of resources, the UE may consider the CCEs in the wideband CORESET in relation to occasions or segments of a second CORESET. The second CORESET may correspond to the UE bandwidth. For example, the size of the second CORESET in the frequency domain may be equal to or less than the maximum bandwidth of the UE. A CCE-to-REG mapping in the occasions of the second CORESET may include an additional REG offset for each successive occasion of the second CORESET, which may be identified by the UE in step 124. Thus, for example, in adjacent occasions or segments of the second CORESET, there may be a REG offset to ensure greater frequency diversity. In step 126, the UE may determine the PDCCH candidates based on, by identifying CCEs in the wideband CORESET and calculating or looking up occasions of the second CORESET.

FIGS. 2A through 2E illustrate various configurations of the second CORESET, which a first segment from a plurality of segments of the second CORESET may be the same as a first portion of a first CORESET (or wideband CORESET) in 20 MHz bandwidth, and the remaining segments of the second CORESET may be configured for transmission to a UE with a 5 MHz bandwidth.

Figure 2A:
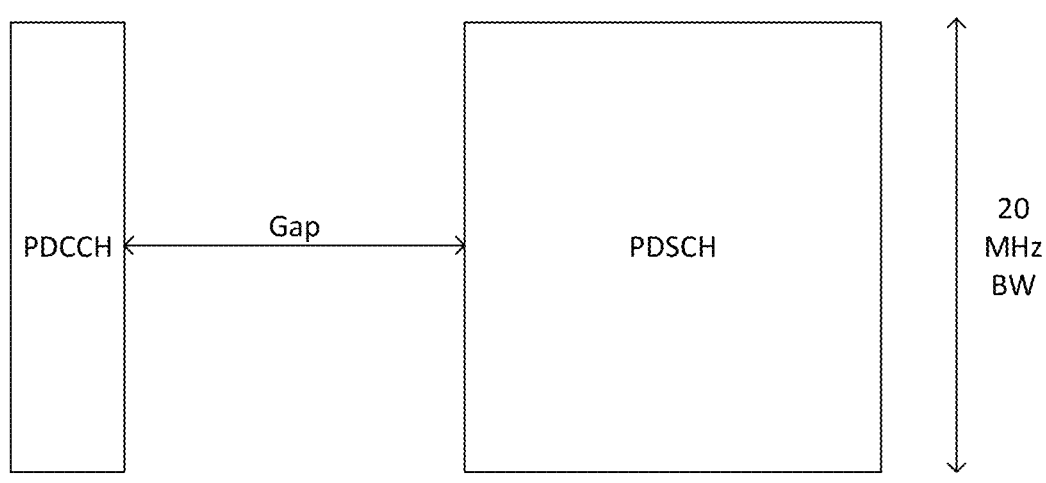
FIG. 2A illustrates a user equipment configured with a first control resource set with a wide bandwidth.

FIG. 2A illustrates an example, where a user equipment configured with a wide bandwidth may be configured to receive a first control resource set, for example a CORESET, with a wide bandwidth. As shown in FIG. 2A, a PDCCH with a 20 MHz bandwidth may be configured with an added time gap to separate the first CORESET in wide bandwidth from corresponding data which are to be transmitted after the time gap in downlinks to UEs configured with the wide bandwidths in a physical downlink shared channel (PDSCH) or the like.

Figure 2B:
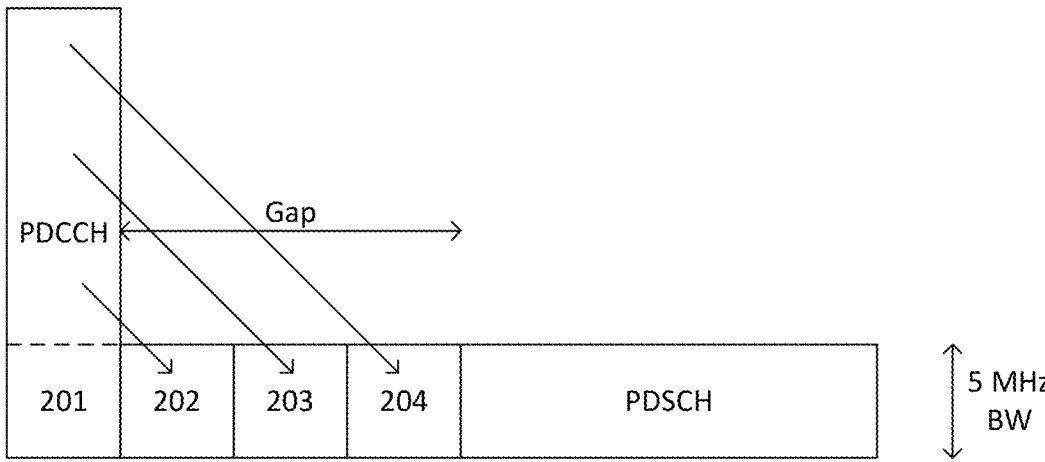
FIG. 2B illustrates a second control resource set within a narrow bandwidth, according to certain embodiments.

FIG. 2B illustrates a second control resource set with a narrow bandwidth, configured to be received by UEs configured with narrower bandwidths, according to certain embodiments. As shown in FIG. 2B, the PDCCH may be provided both in the wide bandwidth form, for example 20 MHz BW, and also in a narrow bandwidth form, for example 5 MHz BW. For example, a first segment 201 or first occasion of the second CORESET may be a first portion of the wide bandwidth CORESET, which may be referred to as the first CORESET. A second segment 202, third segment 203, and fourth segment 204 may correspond to other portions of the wide bandwidth CORESET in time multiplexing without frequency hopping.

Figure 2C:
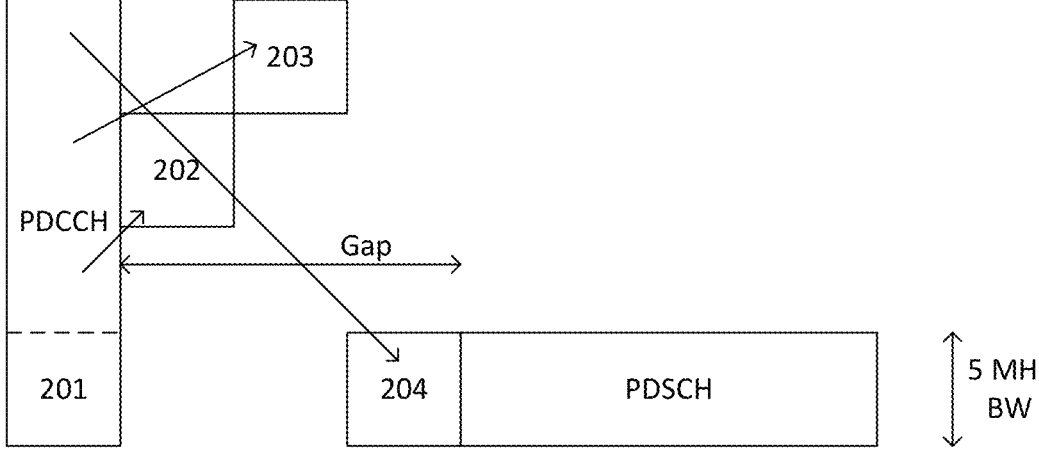
FIG. 2C illustrates a second control resource set within a frequency hopping narrow bandwidth, according to certain embodiments.

FIG. 2C illustrates a second control resource set in time multiplexing with frequency hopping in a narrow bandwidth, according to certain embodiments. In the illustration of FIG. 2C, the approach is similar to that shown in FIG. 2B, except that the second segment 202, third segment 203, and fourth segment 204 are shown as being in different frequency resources from one another. In this example, both the first segment 201 and the fourth segment 204 are in the same frequency resource, but this is not required.

Figure 2D:
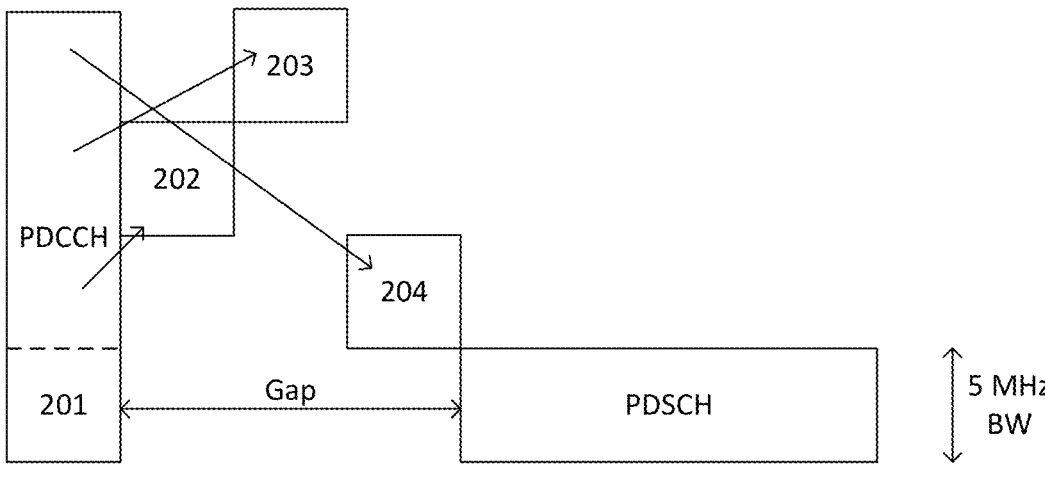
FIG. 2D illustrates a second control resource set within a frequency hopping narrow bandwidth with data transmission following a first segment of the second control resource set, according to certain embodiments.

FIG. 2D illustrates a second control resource set within a frequency hopping narrow bandwidth with data transmission following a first segment of the second control resource set, according to certain embodiments. In this example, the data to be transmitted to the UE may be scheduled with respect to the frequency resource occupied by the first segment, segment 201, of the second control resource set.

Figure 2E:
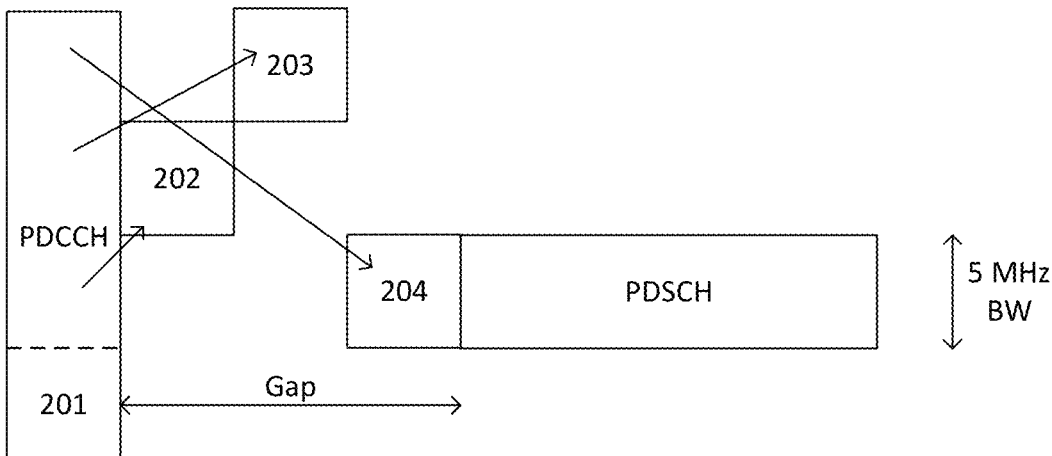
FIG. 2E illustrates a second control resource set within a frequency hopping narrow bandwidth with data transmission following a last segment of the second control resource set, according to certain embodiments.

FIG. 2E illustrates a second control resource set within a frequency hopping narrow bandwidth with data transmission following a last segment of the second control resource set, according to certain embodiments. In this example, the data to be transmitted to the UE may be scheduled with respect to the frequency resource occupied by the last segment, segment 204, of the second control resource set.

In FIGS. 2A-2E, an eRedCap UE may be activated or configured to receive the first CORESET in a wide BW, such as 20 MHz. The activated BWP of eRedCap UE may configure the CORESET locations including the legacy CORESET and the multiple second CORESETs.

In certain implementations, the eRedCap UE and gNB may use this activation scheme option, if it is inefficient to configure an independent narrow BWP. An example where such configuration may be inefficient may be when an eRedCap UE is only to maintain a short connection period. For activation of a BWP, an eRedCap UE may optionally send an activation signal to a network element such as a gNB. Then, the eRedCap UE may become activated in a wider BWP than 5 MHz. Also, the gNB may use an extended format of CORESET including both the wider CORESET or first CORESET using a full activated BWP, and the second CORESET using a reduced BW within the activated BWP. In certain example implementations, the gNB may not actually use the wider CORESET, or first CORESET, to transmit PDCCH.

The time/frequency of the second CORESET may be configured by adding a new field to the information element (IE), ControlResourceSet. The new field may be used to send the resource information of second CORESET via radio resource control (RRC) signaling. Alternatively, the second CORESET may be implicitly determined without adding a new field in a RRC message. For instance, a certain bit string of frequencyDomainResources, such as all zeros of 45 bits, in ControlResourceSet may be reserved to implicitly indicate a pre-determined resource of second CORESET.

A second CORESET may provide a time/frequency resource configuration for where a PDCCH transmission occurs within the reduced BW of eRedCap UE. Therefore, the PDCCH of eRedCap may be transmitted through the segments of the second CORESET. Then, on the UE side, PDCCH candidates may be monitored within the second CORESET to check whether PDCCH is received in those candidates.

The second CORESET may be added after the resource of a wider CORESET. The second CORESET may be used to transmit at least part of the information of the original PDCCH as provided in the wider CORESET. When transmitting in the second CORESET for eRedCap UE, multiple operation modes may be supported, as illustrated in FIGS. 2B through 2D.

A time gap may be provided between the wider CORESET, or first CORESET, and the resources for data transmission, such as on PDSCH. During the time gap, the segments of the second CORESET for eRedCap UE may be provided. The length of the time gap may be at least the total time duration spanned by the segments of the second CORESET that are not part of the wider CORESET. For example, in FIGS. 2B through 2D, segments 202, 203, and 204 are not part of the wider CORESET, but segment 201 is also a part of the wider CORESET. Thus, the time gap is equivalent to the combined times of remaining segments 202, 203, and 204. The length of the time gap may be the sum of all remaining segments of the second CORESET time periods and a retuning time, which may be a symbol, slot, or gNB-configured value. When the options of FIG. 2B, 2C, or 2E are used, the scheduling delay to complete PDCCH processing and retuning may be minimized, as the PDSCH for the UE may be received using the same tuning as the fourth segment 204, and by starting to buffer data even before the completion of PDCCH decoding.

In the case where an NR UE only needs to receive a PDCCH in the wider CORESET, the data for the NR UE may be scheduled after the time gap. Therefore, by the addition of the time gap, data transmission for the NR UE will not be blocked by any transmissions in the second CORESET. In some embodiments, a length of the time gap may be signaled to the NR UE, for example the length of the time gap may be indicated in the PDCCH and preconfigured using higher-layer signaling.

In an example, the second CORESET may include at least a PDCCH indicating a next second CORESET location. In doing so, when a gNB sends a PDCCH in a next occurrence of the second CORESET, eRedCap UE may successfully monitor the correct location. The eRedCap UE may monitor both the wider CORESET, or first CORESET, and the additional second CORESET occasions. When the eRedCap UE starts to monitor the wider CORESET, which has a wider bandwidth than the eRedCap UE's BW, the gNB may use the narrower bandwidth, for example 5-MHz, resources within the wider CORESET to send the RedCap UE a PDCCH. Then, the eRedCap UE may receive DCI in the PDCCH indicating the next location of second CORESET.

To dynamically indicate the frequency hopping pattern, the hopping pattern may also be predetermined. Once the eRedCap UE observes the four 5-MHz second CORESET occurrences, the UE has effectively monitored all the parts of one 20-MHz CORESET. Thus, this may be viewed as the gNB using a form of time-division multiplexing (TDM) of CORESET between 20-MHz UE and 5-MHz UE.

After the transmission in the wider CORESET, the second CORESET may be used for transmission within the narrow BW at the different time instances.

In FIGS. 2B through 2E, when each segment of the second CORESET is used to transmit the PDCCH from different parts of the legacy CORESET, segments of the second CORESET may be mapped to different frequency resources, which may be partial frequency resources of the activated wide BWP. Such operation may enhance diversity gain.

To monitor the different segments of the second CORESET in FIGS. 2C to 2E, the eRedCap UE may retune to different frequencies, as the eRedCap UE may only be able to monitor a narrow BW. In the examples of FIGS. 2B to 2E, the eRedCap UE may monitor a quarter of the wider CORESET in the first segment. To monitor the rest of the parts of the PDCCH that may be transmitted in the wider CORESET, remapping may be done to monitor the different parts over three additional segments.

The frequency resources of the second CORESET may change over time as shown in FIGS. 2C through 2E. The options shown in FIGS. 2C to 2E may involve a retuning gap before each second CORESET segment so that the UE may retune before the UE starts to receive the part of the PDCCH in the next segment. As a result, once all transmission in all the segments of the second CORESET is complete, the data of PDSCH may be transmitted in a 5 MHz BW. The data may use the frequency resources used in the first slot as shown in FIGS. 2B, 2C, and 2E. It is also possible that the data may be transmitted in another frequency resource, as shown in FIG. 2E.

Figure 3:
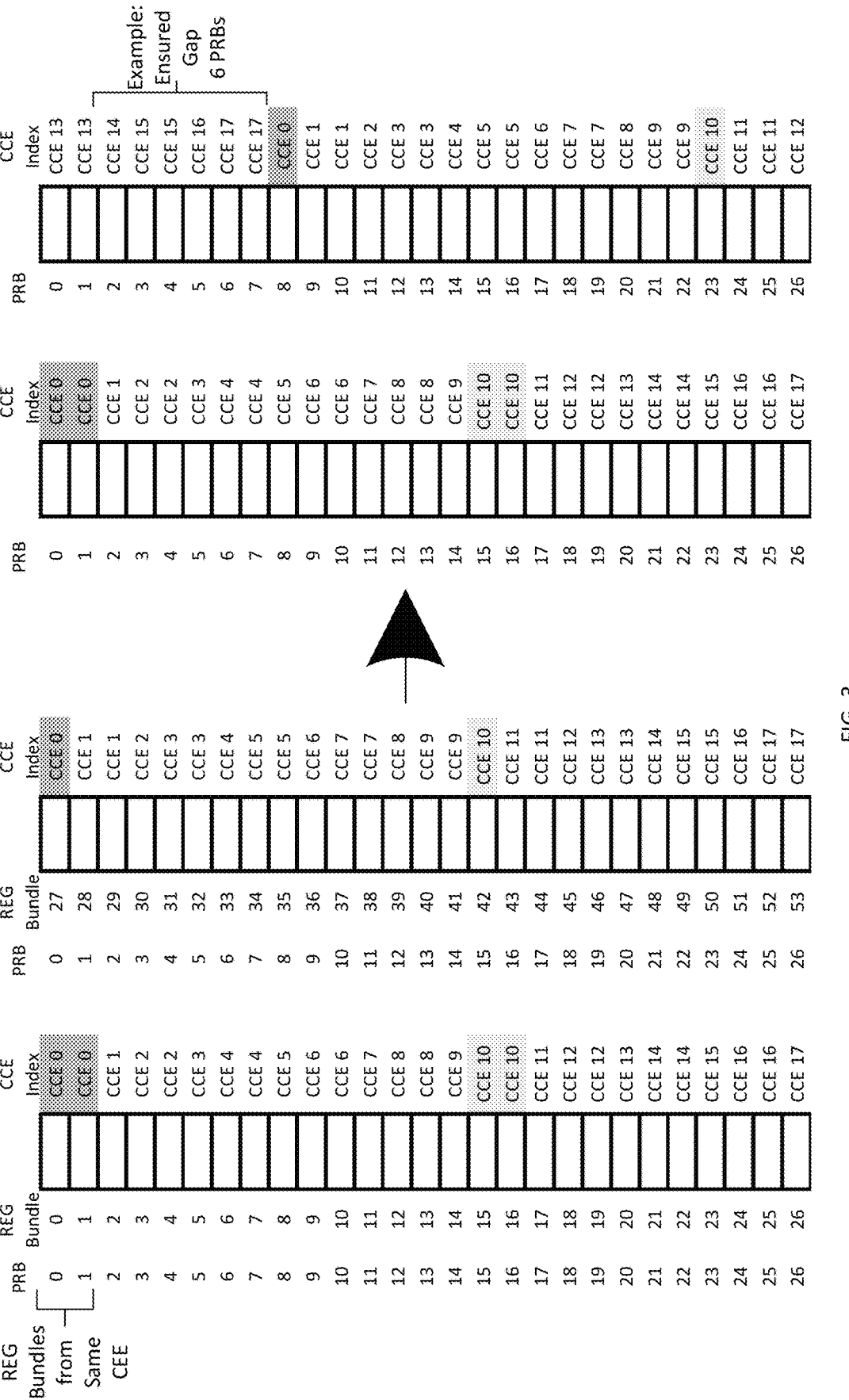
FIG. 3 illustrates reordering interleaved control channel element to resource element group mapping, according to certain embodiments.

FIG. 3 illustrates reordering interleaved control channel element to resource element group mapping, according to certain embodiments. The approach illustrated in FIG. 3 may provide for reordering interleaved CCE-to-REG mapping that may improve or maximize frequency diversity.

When transmitting in the segments of the second CORESET, which may also be referred to as blocks below, certain embodiments may provide an offset in the CCE-to-REG mapping by re-ordering the REGs before the interleaved CCE-to-REG mapping. The offset may increase frequency diversity and partially compensate for coverage loss incurred by a possible alignment in frequency of REGs in different segments that are mapped to the same CCE in the case of BW reduction of RedCap UE.

In FIG. 3, the left-side example shows that 54 REGs occupying a 10 MHz BW may be divided into two parts, and each part may be transmitted at a different time using a 5 MHz BW. The current interleaver may be mapping CCE0 to REG bundle 0, 1, and 27 in order to maximize frequency diversity. In that case, by dividing the CORESET into two parts and sequentially transmitting each part, both REG bundle 0 and 27 may be transmitted via PRB0 at different times. Therefore, certain embodiments may provide an offset to yield a frequency gap when transmitting REG bundles of the same CCE index.

In FIG. 3, the right-side example shows that a gap may be configured in the CCE-to-REG mapping. For instance, the REG bundles may be shifted by 8 physical resource blocks (PRBs) in the second part. This shift may help to ensure frequency diversity. Frequency diversity may also be enhanced by using interleaver size R of 3 or 6, instead of 2, but this mechanism may impact the interleaver processing of all UEs in the BWP instead of only a 5 MHz RedCap UE. In this example, the interleaver size is 2.

The PRB shifting of the REG bundles may be achieved by a new interleaver function to increase the frequency distance between the REG bundles of a CCE in different segments of the second CORESET that may have a correlated information.

An example of a new interleaver function that may achieve the 8 PRBs shifting in FIG. 3 may be defined as follows. The example may change the CCE indexes allocated to the consecutive REG bundles. By increasing the distance between REG bundles in frequency domain, this function may increase the frequency diversity. In the following, $$N_{REG}^{CORESET}$$

may be the number of resource element groups in the second CORESET, $$N_{RB}^{CORESET}$$

may be the number of resource blocks in the second CORE-SET, and $$N_{symb}^{CORESET}$$

may be the number of symbols in the second CORESET:

$$N_{REG}^{CORESET} = N_{RB}^{CORESET} N_{symb}^{CORESET}.$$

Next, in the following, $$N_{REG}^{BLOCK}$$

may be the number of resource element groups in a block or segment of the second CORESET and $$N_{RB}^{BLOCK}$$

may be the number of PRBs in the original block before remapping:

$$N_{REG}^{BLOCK} = N_{RB}^{BLOCK} N_{symb}^{CORESET}.$$

With this background, a current interleaver function may be defined as:

$$f(x) = (rC + c + n_{shift}) \bmod (N_{REG}^{CORESET} / L),$$

where $$x = cR + r, r = 0, 1, \dots, R - 1, c = 0, 1,$$
$$\dots, C - 1, C = N_{REG}^{CORESET} / (LR), L = 2$$

may be the REG bundle size, and R=2 may be the interleaver size. A modified function may be defined as follows:

$$f'(x) = t_{div} * N_{REG}^{BLOCK} / L + (t_{div} * n_{offset} + t_{mod}) \bmod (N_{REG}^{BLOCK} / L),$$

where $$t_{div} = f(x)div\left(N_{REG}^{BLOCK} / L\right),\ t_{mod} = f(x)\bmod\left(N_{REG}^{BLOCK} / L\right),$$

$$t_{div} = f(x)div\left(N_{REG}^{BLOCK} / L\right),\ n_{offset} = 8,\ \text{and}\ n_{shift} = 0$$

in the example of FIG. 3.

In this example, the current interleaver function f(x) may be used to calculate the CCE-to-REG re-mapping function f'(x). The function f'(x) may remap the interleaved result from f(x). By using f'(x), the first block may not apply shifting, while shifting may be adopted into the second and subsequent blocks. Function f'(x) adopts at least two parameters:

$$N_{RB}^{BLOCK}$$

and $n_{offset}$. As mentioned above, $$N_{RB}^{BLOCK}$$

may be the number of PRBs in the original block before remapping. For example, $$N_{RB}^{BLOCK} = 27$$

in the example of FIG. 3. Also, $n_{offset}$ may be the number of shifting PRBs. Thus, in FIG. 3, $n_{offset}$=8.

The gNB may configure any constant for $n_{offset}$, including $n_{offset}$=8 as in FIG. 3. As another embodiment, the definition, $$n_{offset} = \text{floor}\left(N_{REG}^{BLOCK} / L / R\right)$$

may be used to increase the ensured gap. The remapping function may be backward compatible, and therefore may have flexibility. If $n_{offset}$=0, the gNB may use the existing interleaved CCE-to-REG mapping in the current specification without any change. The gNB may choose either 0 or a non-zero value for $n_{offset}$.

The eRedCap UE may benefit from knowing the values of $$N_{RB}^{BLOCK}$$

and $n_{offset}$. Therefore, the gNB may initially deliver the values via system information block (SIB) or RRC signaling.

Figure 4:
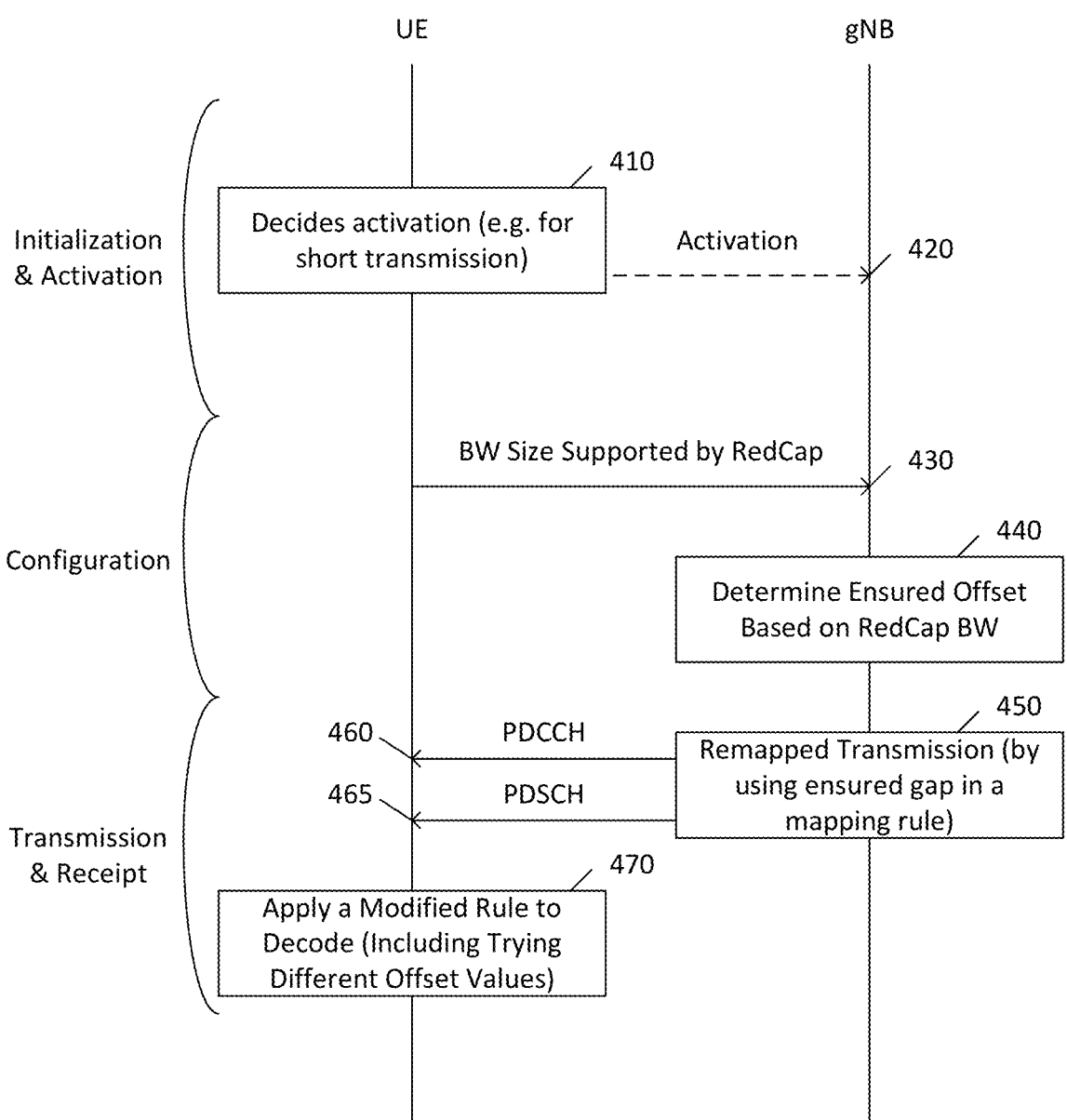
FIG. 4 illustrates a signaling flow of a method according to certain embodiments.
Figure 5:
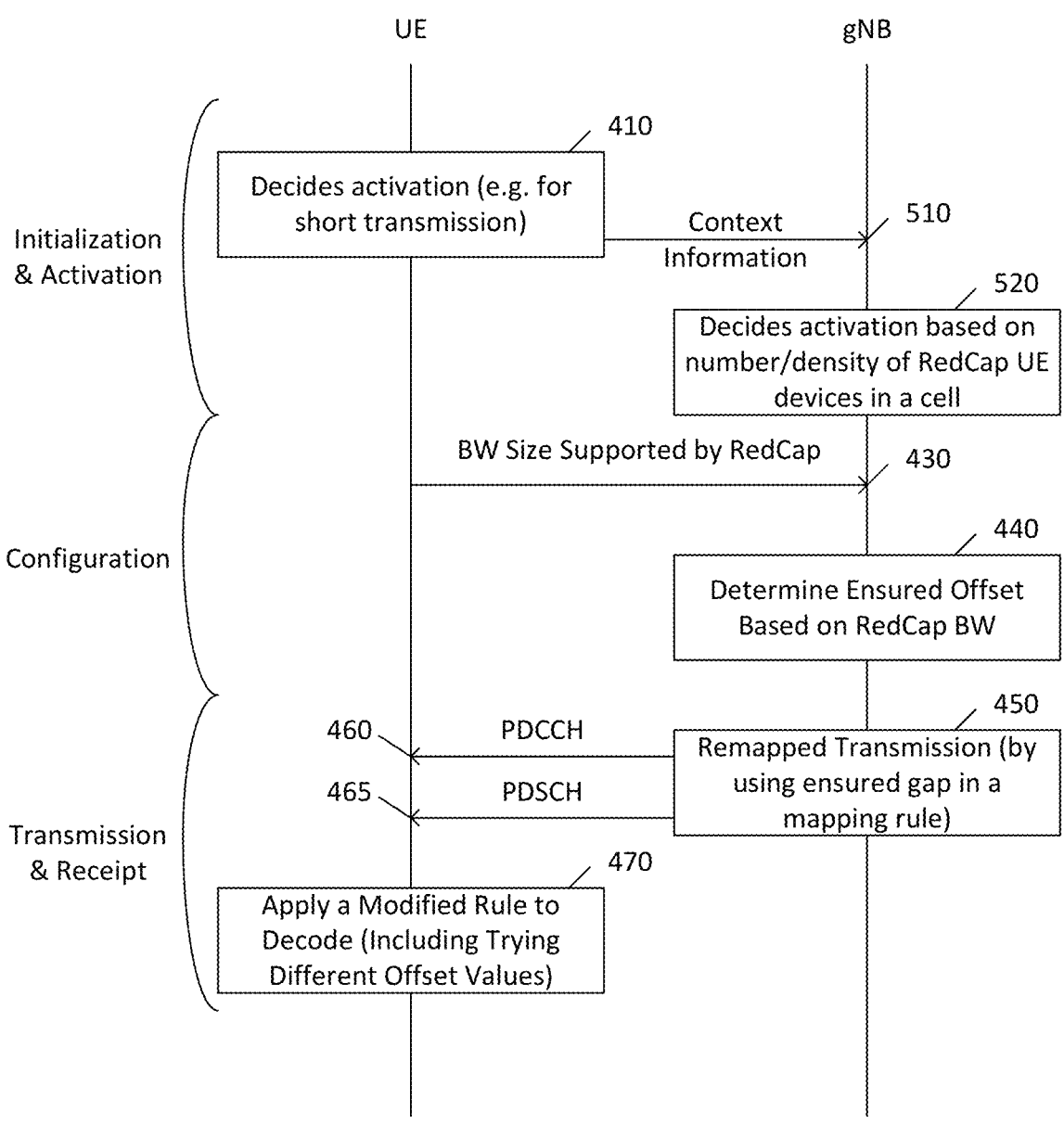
FIG. 5 illustrates an alternative signaling flow of a method according to certain embodiments.

Possible signaling flows related to FIGS. 2B through 2E are shown in FIGS. 4 and 5.

FIG. 4 illustrates a signaling flow of a method according to certain embodiments. As shown in FIG. 4, a RedCap UE may receive an optional signal in a reduced BWP. If in step 410 the RedCap UE is expected to maintain a short connection period or it is unnecessary to configure an independent narrow BWP, in step 420 the RedCap UE may optionally send an activation signal so that gNB transmits the data by using the reduced BW within a wider BWP. The determination or decision to transmit the data using the reduced BW within the wider BWP may be made by the gNB.

In practice, after the initialization, which may be without the need for an activation signal, the UE may, in step 430, indicate the BW size that the UE may access. The UE may then be optionally activated within a wide BWP, for example 20 MHz, which may be greater than the reduced BW, for example 5 MHz. Next, at 440 the gNB may determine the ensured offset based on the UE's report on BW restriction. The offset may be for example a distance in frequency domain, such as the number of shifted PRBs, $n_{offset}$ in the equations described above. With the offset, the REG bundles of the same CCE index may, in step 450, be spread over frequency domain as shown in FIG. 3. PDCCH may be transmitted at 460 and PDSCH may be transmitted in step 465. At 470, the UE may apply a modified CCE-to-REG mapping rule to decode the downlink channels. The UE may try different offset values.

FIG. 5 illustrates an alternative signaling flow of a method according to certain embodiments. The signaling flow of FIG. 5 may be similar to that of FIG. 4, except that instead of receiving an activation signal from the UE, the gNB may receive context information from the UE at 510 and decide activation at 520, based on the number or density of RedCap UE devices in a cell.

Thus, in FIG. 5, the UE sending context information at 510 may lead to the gNB activating remapped transmission at 520. For initialization, the UE may decide to be activated within a wider BW than the data-transmitting BW. The UE may send context information such as the data transmission period, for example the context information may be expressed in terms of data size in UE's buffer.

Figure 6:
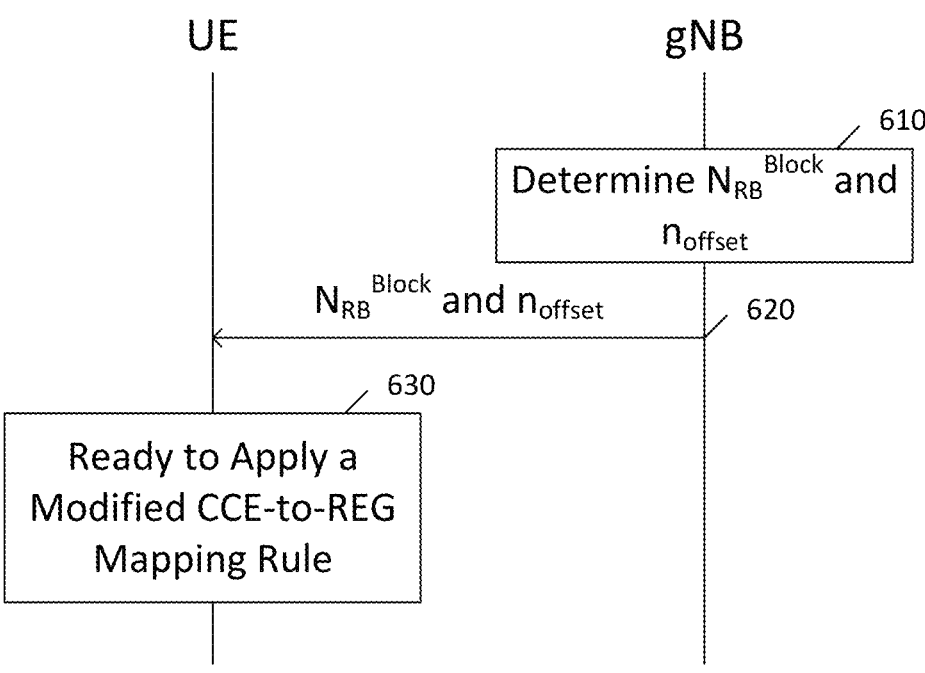
FIG. 6 illustrates a signaling flow for remapping parameters, according to certain embodiments.

FIG. 6 illustrates a signaling flow for remapping parameters, according to certain embodiments. As shown in FIG. 6, at 610, the gNB may determine $$N_{RB}^{BLOCK}\ \text{and}\ n_{offset}.$$

Then, at 620, $$N_{RB}^{BLOCK}$$

and $n_{offset}$ may be signalled to the UE. SIB or RRC signalling may be used, as mentioned above.

Figure 7:
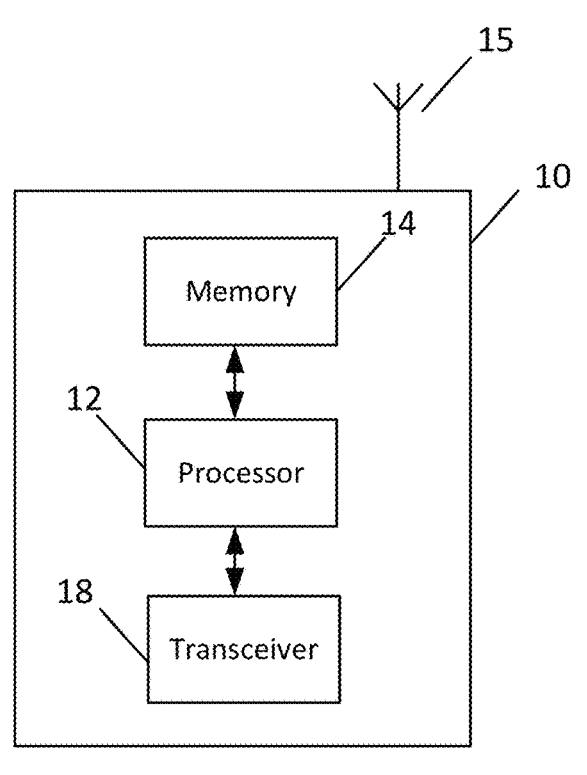
FIG. 7 illustrates an example block diagram of a system, according to an embodiment.
Figure 7:
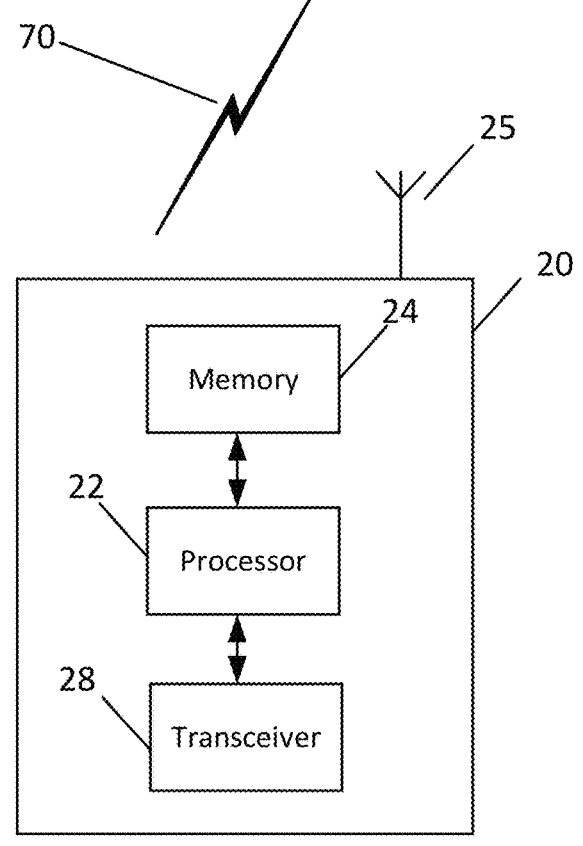

FIG. 7 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 7.

As illustrated in the example of FIG. 7, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 7, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to a second resource set for a reduced capability user equipment or enhanced reduced capability user equipment as well as a mapping offset for frequency diversity.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 may include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein. The term "non-transitory," as used herein, may correspond to a limitation of the medium itself (i.e., tangible, not a signal) as opposed to a limitation on data storage persistency (e.g., RAM vs. ROM).

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-6, or any other method described herein. In some embodiments, as discussed herein, apparatus 10 may be configured to perform a procedure relating to providing a second resource set for a reduced capability user equipment or enhanced reduced capability user equipment as well as a mapping offset for frequency diversity, for example.

FIG. 7 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7.

As illustrated in the example of FIG. 7, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 may include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-6, or any other method described herein. For example, in an embodiment, apparatus 20 may be controlled to perform a process relating to providing a second resource set for a reduced capability user equipment or enhanced reduced capability user equipment as well as a mapping offset for frequency diversity, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may enable operation of a 5-MHz UE with configuration of CORESETs that are wider than 5 MHz through the use of a second CORESET. Moreover, certain embodiments may enable overcoming loss of frequency diversity for PDCCH in second CORESET that may occur with some configurations of CCE-to-REG mapping through configurable REG offset. Two parameters, $N_{RB}^{BLOCK}$ and $n_{offset}$, may capture the characteristics of the BW reduction for eRedCap UE.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that may be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

3GPP 3rd Generation Partnership Project
BW Bandwidth

BWP Bandwidth Part
CCE Control Channel Element
CORESET Control resource set
eRedCap Enhanced RedCap
FR1 Frequency range 1
FR2 Frequency range 2
gNB Next generation Node B
PDCCH Physical Downlink Control Channel
RedCap Reduced Capability
REG Resource Element Group
UE User Equipment

We claim:

1. A terminal device, comprising:
at least one processor; and
at least one memory storing instructions that, when executed by the at least one processor, cause the terminal device at least to:
receive from a network element in a radio access network, a first configuration for a first control resource set (CORESET) having a bandwidth that exceeds a first bandwidth of the terminal device; and
determine a second configuration for a second CORESET, wherein the second CORESET comprises a plurality of segments, wherein a second bandwidth of each segment of the plurality of segments does not exceed the first bandwidth of the terminal device, and the second configuration is signaled to the terminal device or is determined by the terminal device based on predefined rules, and the plurality of segments are determined based on the first configuration.

2. The terminal device of claim 1, wherein a first segment of the plurality of segments of the second CORESET comprises a subset of the first CORESET.

3. The terminal device of claim 1, wherein the terminal device is caused to determine control channel elements (CCEs) corresponding to resource element group (REG) bundles in the second CORESET, based on a control channel element to resource element group (CCE-to-REG) mapping relationship.

4. The terminal device of claim 3, wherein an additional resource element group (REG) offset for each successive segment of the second CORESET is applied with the CCE-to-REG mapping to obtain the CCEs in the second CORESET.

5. The terminal device of claim 3, wherein the CCE-to-REG mapping relationship is determined by a remapping function f'(x), which is based on an interleaving function f(x) and the additional resource element group (REG) offset.

6. The terminal device of claim 1, wherein the plurality of segments of the second CORESET are time domain multiplexed.

7. The terminal device of claim 1, wherein the bandwidth of the first CORESET is an integer multiple of the bandwidth of each segment of the plurality of segments of the second CORESET.

8. An apparatus, comprising:
at least one processor; and
at least one memory storing instructions that, when executed by the at least one processor, cause the apparatus at least to:

send to a terminal device a first configuration for a first control resource set (CORESET) having a bandwidth that exceeds a first bandwidth of the terminal device; and
provide downlink control information to the terminal device in a second CORESET, wherein:
the second CORESET comprises a plurality of segments, wherein a second bandwidth of each segment of the plurality of segments does not exceed the first bandwidth of the terminal device;
a first segment of the plurality of segments of the second CORESET comprises a subset of the first CORESET; and
a time gap is provided following the first CORESET, where the time gap comprises at least a sum of time periods of other segments of the plurality of segments of the second CORESET not including the subset of the first CORESET.

9. The apparatus of claim 8, wherein a first downlink control information sent in the first CORESET is substantially the same as a second downlink control information sent in the plurality of segments of the second CORESET to the terminal device.

10. The apparatus of claim 9, wherein the first downlink control information in the first CORESET is sent to another terminal device.

11. The apparatus of claim 10, wherein the another terminal device is scheduled to receive a data transmission after the time gap following the first CORESET.

12. The apparatus of claim 8, wherein the apparatus comprises an access network device.

13. A method for a terminal device, the method comprising:
receiving from a network element in a radio access network, a first configuration for a first control resource set (CORESET) having a bandwidth that exceeds a first bandwidth of the terminal device; and
determining a second configuration for a second CORESET, wherein the second CORESET comprises a plurality of segments, wherein a second bandwidth of each segment of the plurality of segments does not exceed the first bandwidth of the terminal device, wherein the second configuration is signaled to the terminal device or is determined by the terminal device based on predefined rules, and the plurality of segments are determined based on the first configuration.

14. The method of claim 13, wherein a first segment of the plurality of segments of the second CORESET comprises a subset of the first CORESET.

15. The method of claim 13, further comprising:
determining control channel elements (CCEs) corresponding to resource element group (REG) bundles in the second CORESET, based on a control channel element to resource element group (CCE-to-REG) mapping relationship.

16. The method of claim 15, wherein an additional resource element group (REG) offset for each successive segment of the second CORESET is applied with the CCE-to-REG mapping to obtain the CCEs in the second CORESET.

*    *    *    *    *